(12) United States Patent
Carbullido et al.

(10) Patent No.: US 8,260,660 B2
(45) Date of Patent: Sep. 4, 2012

(54) SYSTEM AND METHOD FOR UN-ISSUING VOTING CREDITS

(75) Inventors: Ken D. Carbullido, Omaha, NE (US);
Brandon M. Elwood, Omaha, NE (US);
Shari L. Little, Omaha, NE (US);
Jessica E. Blackman, Omaha, NE (US)

(73) Assignee: ES&S Innovations, LLC, Omaha, NE (US)

( * ) Notice: Subject to any disclaimer, the term of this patent is extended or adjusted under 35 U.S.C. 154(b) by 202 days.

(21) Appl. No.: 12/704,612

(22) Filed: Feb. 12, 2010

(65) Prior Publication Data

US 2011/0202392 A1 Aug. 18, 2011

(51) Int. Cl.
*G06Q 99/00* (2006.01)

(52) U.S. Cl. .......................................... 705/12; 705/51

(58) Field of Classification Search ........................ None
See application file for complete search history.

(56) References Cited

U.S. PATENT DOCUMENTS

| | | | | |
|---|---|---|---|---|
| 6,799,723 B2* | 10/2004 | Kotob et al. | ................... | 235/386 |
| 7,036,730 B2* | 5/2006 | Chung | ........................... | 235/386 |
| 7,197,167 B2 | 3/2007 | Chung et al. | | |
| 7,406,480 B2* | 7/2008 | Seibel et al. | ........................ | 1/1 |
| 7,418,401 B2 | 8/2008 | Bogasky et al. | | |
| 7,422,150 B2* | 9/2008 | Chung | ........................... | 235/386 |
| 7,431,209 B2* | 10/2008 | Chung | ........................... | 235/386 |
| 7,497,377 B2 | 3/2009 | Watson | | |
| 7,561,724 B2 | 7/2009 | Chung et al. | | |
| 7,562,819 B2 | 7/2009 | Keenan | | |
| 7,565,540 B2 | 7/2009 | Bogasky et al. | | |
| 7,729,991 B2 | 6/2010 | Rodriguez et al. | | |
| 2002/0019767 A1* | 2/2002 | Babbitt et al. | ................... | 705/12 |
| 2002/0077886 A1* | 6/2002 | Chung | ........................... | 705/12 |
| 2003/0034393 A1* | 2/2003 | Chung | ........................... | 235/386 |
| 2003/0159032 A1 | 8/2003 | Gerck | | |
| 2004/0046021 A1* | 3/2004 | Chung | ........................... | 235/386 |
| 2005/0216332 A1 | 9/2005 | Lewin | | |
| 2005/0218224 A1* | 10/2005 | Boldin | ........................... | 235/386 |
| 2005/0263594 A1* | 12/2005 | Onischu | ........................... | 235/386 |
| 2006/0026058 A1 | 2/2006 | White | | |
| 2006/0036480 A1 | 2/2006 | Goldschlag et al. | | |
| 2006/0036481 A1 | 2/2006 | White | | |
| 2006/0070119 A1* | 3/2006 | Ogram | ............................. | 726/4 |

(Continued)

OTHER PUBLICATIONS

Menezes et al., "Handbook of Applied Cryptography," 1997, CRC Press LLC, all pages.*

(Continued)

*Primary Examiner* — Jacob C. Coppola
(74) *Attorney, Agent, or Firm* — Stinson Morrison Hecker LLP

(57) ABSTRACT

The present invention is directed to a system and method for un-issuing a voting credit that has been erroneously issued to a voter in an election. The system includes an electronic poll book that is used to check-in a voter by locating the appropriate voter record and analyzing the voter record to determine whether a voting credit has been issued to the voter in the election. If a voting credit has been issued to the voter, the electronic poll book displays an indication that the voter has already voted in the election. If it is determined that the voting credit was erroneously issued to the voter, a poll worker enters an un-issue code into the poll book. The poll book verifies the validity of the un-issue code and updates the voter record so as to un-issue the voting credit. As such, the voter may vote a regular ballot in the election.

45 Claims, 9 Drawing Sheets

U.S. PATENT DOCUMENTS

| | | | |
|---|---|---|---|
| 2006/0169778 A1* | 8/2006 | Chung | 235/386 |
| 2006/0237535 A1* | 10/2006 | Watson | 235/386 |
| 2006/0289638 A1 | 12/2006 | Schilling | |
| 2007/0235535 A1* | 10/2007 | Davoust et al. | 235/386 |
| 2007/0272749 A1* | 11/2007 | Gehrke et al. | 235/386 |
| 2008/0288783 A1* | 11/2008 | Jansen et al. | 713/189 |
| 2009/0099908 A1 | 4/2009 | Seibel et al. | |
| 2009/0152350 A1* | 6/2009 | Mugica et al. | 235/386 |
| 2009/0179071 A1* | 7/2009 | Backert et al. | 235/51 |

OTHER PUBLICATIONS

Advanced Voting Systems, document entitled "WINPoll Book The Electronic PollBook is Here!", 2 pgs. (published more than 1 year prior to Feb. 12, 2010, the filing date of this application).

Premier Election Solutions, brochure entitled "Express Poll-5000", dated Sep. 2007, 2 pgs.

Dominion Voting Systems Corporation, brochure entitled "Democracy Suite EMS", Edition 2007, 4 pgs. (published more than 1 year prior to Feb. 12, 2010, the filing date of this application).

Hart Intercivic, brochure entitled "eRegistry. Statewide Voter Registration and Election Management", 2 pgs. (published more than 1 year prior to Feb. 12, 2010, the filing date of this application).

Sequoia Voting Systems, brochure entitled "Choices Election Management Solutions", 5 pgs. (published more than 1 year prior to Feb. 12, 2010, the filing date of this application).

INDRA, brochure entitled "Electronic Poll Book", 4 pgs. (published more than 1 year prior to Feb. 12, 2010, the filing date of this application).

Election Systems & Software, Inc., brochure entitled "ES&S Electronic Pollbook(i)", 2 pgs. (published more than 1 year prior to Feb. 12, 2010, the filing date of this application).

Decision Support, brochure entitled "EVID Voter Check-in Made Easy", 4 pgs. (published more than 1 year prior to Feb. 12, 2010, the filing date of this application).

* cited by examiner

| Registrant Information | School District 82—Board Election NOVEMBER 10, 2009 Holt County, NE |  |
|---|---|---|
|  | Center 1 024 – Total Voters: 2 |  |

JOAN A. SMITH has already voted

100 OAK ST.
OMAHA, NE 68137

| Status | Active |
| Precinct | 34.2 |
| Date of Birth | 12/31/33 |
| Gender | FEMALE |
| Registrant ID | 1234567 |
| ID Required | NO |

[Done]

[Un-Issue Credit]

[Back]

FIG. 3D

SYSTEM AND METHOD FOR UN-ISSUING VOTING CREDITS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems, and, more particularly, to a system and method for un-issuing a voting credit that has been erroneously issued to a voter in an election to enable the voter to vote a regular ballot in the election.

2. Description of Prior Art

A variety of methods for tracking registered voters and their voting activities are used in the United states and throughout the world. Paper-based poll books that list all the voters registered to vote in a particular election at a particular polling place are commonly used. In general, when a voter enters a polling place, the poll worker checks-in the voter by locating her name in the poll book, confirming that the voter has not yet voted in the election, and obtaining the voter's signature in the poll book. After the election, the poll book is returned to the central election office where an election administrator updates the voter registration database system by issuing a voting credit for each voter who voted in the election.

More recently, electronic means for tracking registered voters have been used in an increasing number of jurisdictions. In such jurisdictions, electronic poll books are used instead of paper-based poll books. An electronic poll book allows a poll worker to access a database of all the voters registered to vote in a particular election. In general, when a voter enters a polling place, the poll worker uses the electronic poll book to search for the voter's record in the database, confirm that the voter has not yet voted in the election, and issue a voting credit to the voter. In many jurisdictions, the database resides locally on the electronic poll book, which may be periodically synchronized with a central voter database. Alternatively, the electronic poll book may communicate with the central voter database in real-time, in which case the validation of a voter's eligibility to vote and issuance of a voting credit is made directly against the central voter database.

Tracking voting credits for a particular voter is important. In some jurisdictions, a voter is required to vote in the primary election in order to vote in the general election. Voting credits are also used to maintain a voter's active status in the voter database. Also, voting credits are used to ensure that each voter only votes once in a particular election. Political parties also use voting histories to communicate with various types of voters. Thus, a method of accurately issuing and tracking voting credits is critical to a properly run election and a healthy democratic system.

One problem associated with the use of an electronic poll book is that there is no method for un-issuing a voting credit at the polling place if a voting credit was previously issued to a voter in error. Currently, if a voter has been erroneously issued a voting credit, the voter will not be allowed to vote a regular ballot. Instead, the voter will be issued a provisional ballot that will need to be verified and processed at a later time at the central election office, or the voter may not be allowed to vote at all. As such, the voting selections of the voter will not be included in the election day results.

BRIEF SUMMARY OF THE INVENTION

The present invention is directed to a system and method for un-issuing a voting credit that has been erroneously issued to a voter in an election. In an exemplary embodiment, a voter enters a polling place and indicates her desire to vote. Using an electronic poll book, the poll worker searches the database of registered voters to locate the appropriate voter record. If the record includes a previously-issued voting credit, the electronic poll book displays an indication (such as a textual message) that the voter has already voted in the election. In the event that the voter indicates to the poll worker that she has not voted in the election, the poll worker may contact an election administrator at the central election office who has the authority to determine whether the voting credit was issued in error. A voter may be erroneously issued a voting credit, for example, when a poll worker mistakenly selects the voter when checking-in another voter, or when the voter is checked-in but for some reason does not complete the voting process.

If the election administrator determines that the voting credit was issued in error, the administrator generates or locates an un-issue code and provides the un-issue code to the poll worker for entry into the electronic poll book. The un-issue code may comprise, for example, a hash value generated by a conventional hashing algorithm using the voter registration number and election code for the election. Upon receipt of the entered un-issue code, the electronic poll book verities the validity of the un-issue code and updates the voter record in the database so as to un-issue the voting credit. By un-issuing the voting credit, the poll worker is able to check-in the voter on the electronic poll book and allow the voter to vote a regular ballot. As such, the voting selections of the voter will be included in the election day results.

BRIEF DESCRIPTION OF THE DRAWINGS

FIGS. 3A-3E are various screen shots of the electronic poll book of FIG. 1 during the voter check-in process and un-issuing voting credit process.

DETAILED DESCRIPTION OF EXEMPLARY EMBODIMENT

The present invention is directed to a system and method for un-issuing voting credits. While the invention will he described in detail below with reference to an exemplary embodiment, it should be understood that the invention is not limited to the specific system configuration or methodology of this embodiment. In addition, although the exemplary embodiment is described as embodying several different inventive features, one skilled in the art will appreciate that any one of these features could be implemented without the others in accordance with the invention.

Figure 1:
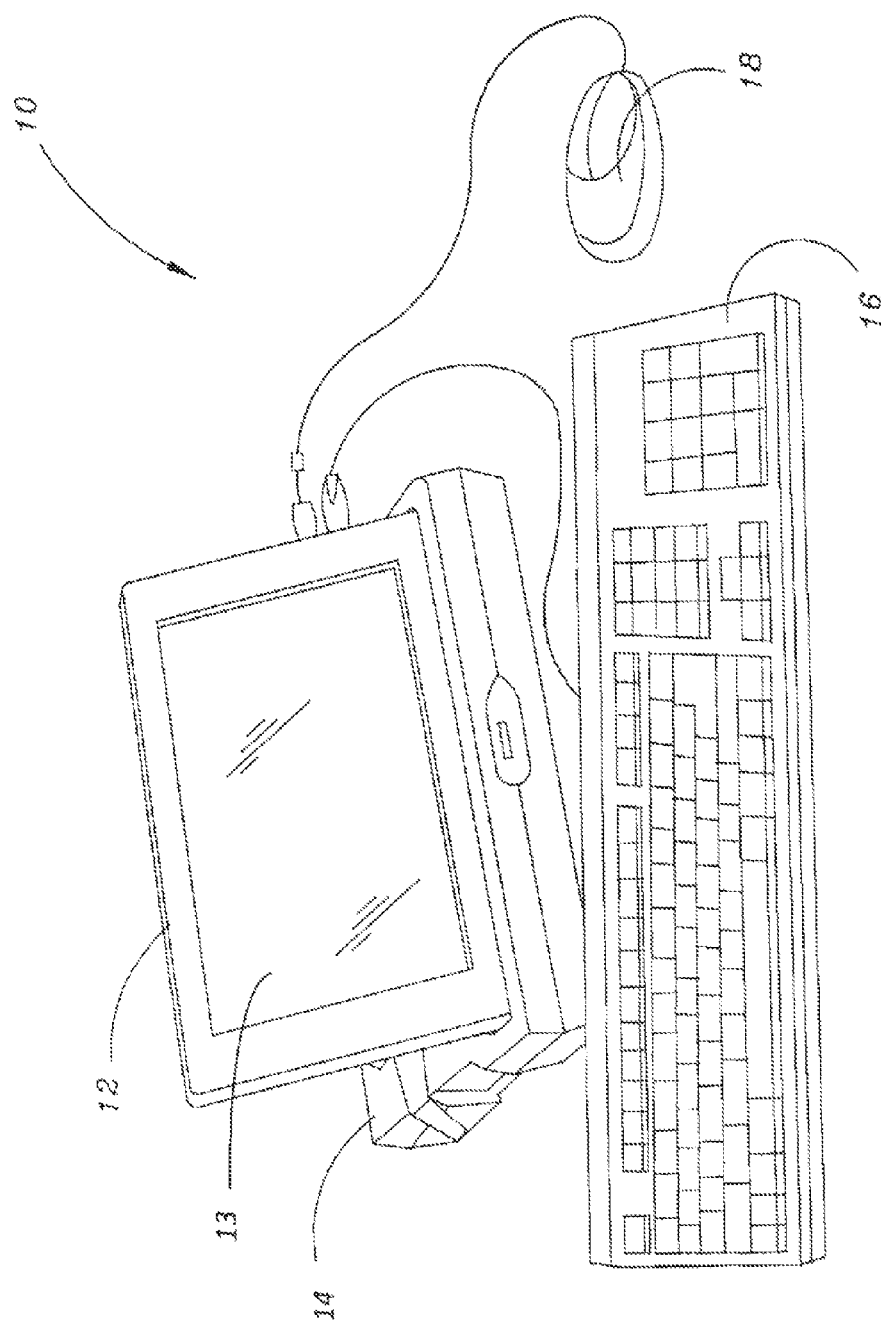
FIG. 1 is a perspective view of an electronic poll book in accordance with an exemplary embodiment of the present invention.

Referring to FIG. 1, a system in accordance with an exemplary embodiment of the present invention is shown generally as reference numeral 10. In general, system 10 includes an electronic poll book 12 mounted on a base 14 that serves to hold the poll book 12 in a slightly-angled upright position during use. When not in use, base 14 is used as a protective case for poll book 12 during transport and storage. Preferably, poll book 12 includes a touchscreen display 13 that serves as both an input device and output device. Poll book 12 may also be connected to other types of input devices, such as a standard keyboard 16 and a mouse 18. In addition, other accessories (not shown) may be connected to poll book 12, such as a signature capture device for electronically capturing a voter's signature during voter check-in, a barcode reader for scanning the barcode on a voter registration card in order to immediately locate a voter registration record, a magnetic stripe reader for scanning identification cards such as a driver's license or state identification, and/or a printer for printing a paper ballot or voter receipt during voter check-in.

Poll book 12 comprises a computing system (such as a programmed general purpose computer, a special purpose computer, or the like) that includes a processor and a storage device for storing a voter database. The processor of poll book 12 is operable to execute computer-readable instructions (e.g., software or firmware) stored on a computer-readable medium (e.g., the computer's internal hard drive, a thumb drive or a compact flash card) to thereby perform the various processes of the present invention, as will be described in greater detail hereinbelow. The storage device of poll book 12 may comprise any type of computer memory, such as the computer's internal hard drive, a thumb drive or a compact flash card. One skilled in the art will appreciate that other types of memory devices may also be used in accordance with the present invention.

As just discussed, the voter database is stored locally on the storage device of poll book 12. Preferably, the database contains voter records for all of the registered voters in the jurisdiction. Alternatively, the voter database may only contain voter records for the voters registered to vote at a particular polling location. Poll book 12 may be a standalone unit, or may be connected to other poll books (not shown) located at the same polling location. For example, poll book 12 may act as a host device and may be in communication with one or more poll books performing as slave devices, wherein the voter database is located only on poll book 12. Several types of computer network connections may be used to network the poll books, including a local area network (LAN), wireless local area network (WLAN) or wide area network (WAN).

Poll book 12 may also be connected to a central server (not shown) via a communication network. The communication network may be any combination of analog, digital, wired and wireless communication equipment and infrastructure suitable for transporting information between poll book 12 and the central server. For example, the communication network may include one or more of the following: the Internet, an intranet, a cellular communication system, a Public Switched Telephone Network (PSTN), a private telephone network, or a satellite communication system. In the exemplary embodiment, poll book 12 communicates with the central server via a wired closed network.

In the exemplary embodiment, the central server is located at the central election office and stores a central voter database containing voter records for all of the registered voters in the jurisdiction. All updates to the voter database on poll book 12 are transmitted to the central server, and all updates received by the central server from various polling locations are communicated back to poll book 12. The updates may be transmitted in batches at various times throughout the day, or may be transmitted on a voter-by-voter basis. Using this synchronization process, poll book 12 is able to access the most current voter information.

Of course, other embodiments of the poll book may be implemented in accordance with the present invention. For example, the poll book may not store any type of voter database, and may instead directly access the central voter database stored on the central server. In another example, the central voter database may not store the entire voter records, but may instead store only a transaction log of the updates made to the various poll books. In yet another example, the poll book may not be connected to a central server, in which case the voter database loaded onto the poll book will not be updated in any manner, or may be manually updated via a removable media device.

The present invention has been described above with reference to the terms "processor," "storage device" and "database." It should be understood that as used herein (including in the claims) the term "processor" may mean either a single processor that performs the described processes or a plurality of processors that collectively perform the described processes; the term "storage device" means either a single storage device that stores the described database(s) or a plurality of storage devices that collectively store the described database(s); and the term "database" means either a single database that contains the described data or a plurality of databases that collectively contain the described data. Thus, the system and method may be implemented with any number of processor(s), storage device(s) and database(s) without departing from the scope of the present invention.

Figure 2:
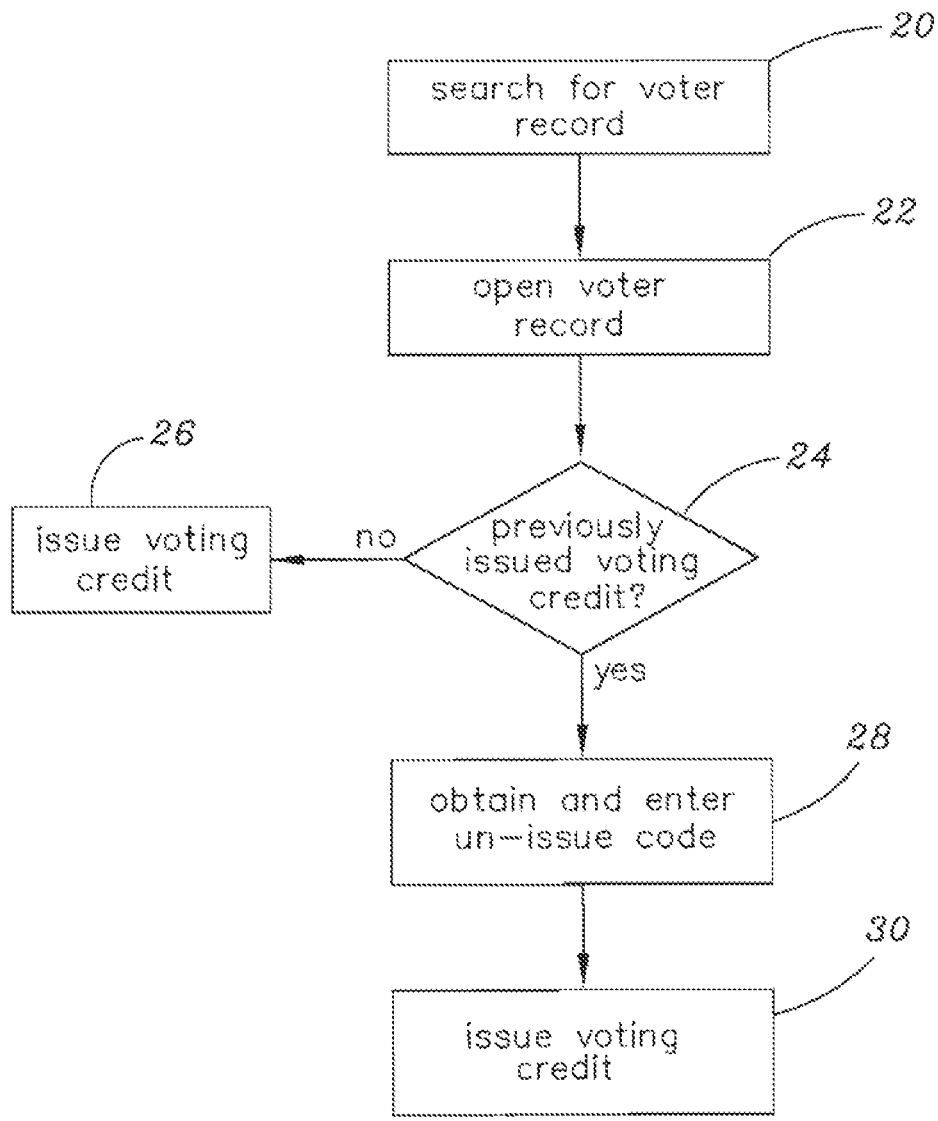
FIG. 2 is a process flow diagram of the voter check-in process and un-issuing voting credit process, which may he implemented using the electronic poll hook of FIG. 1.
Figure 3A:
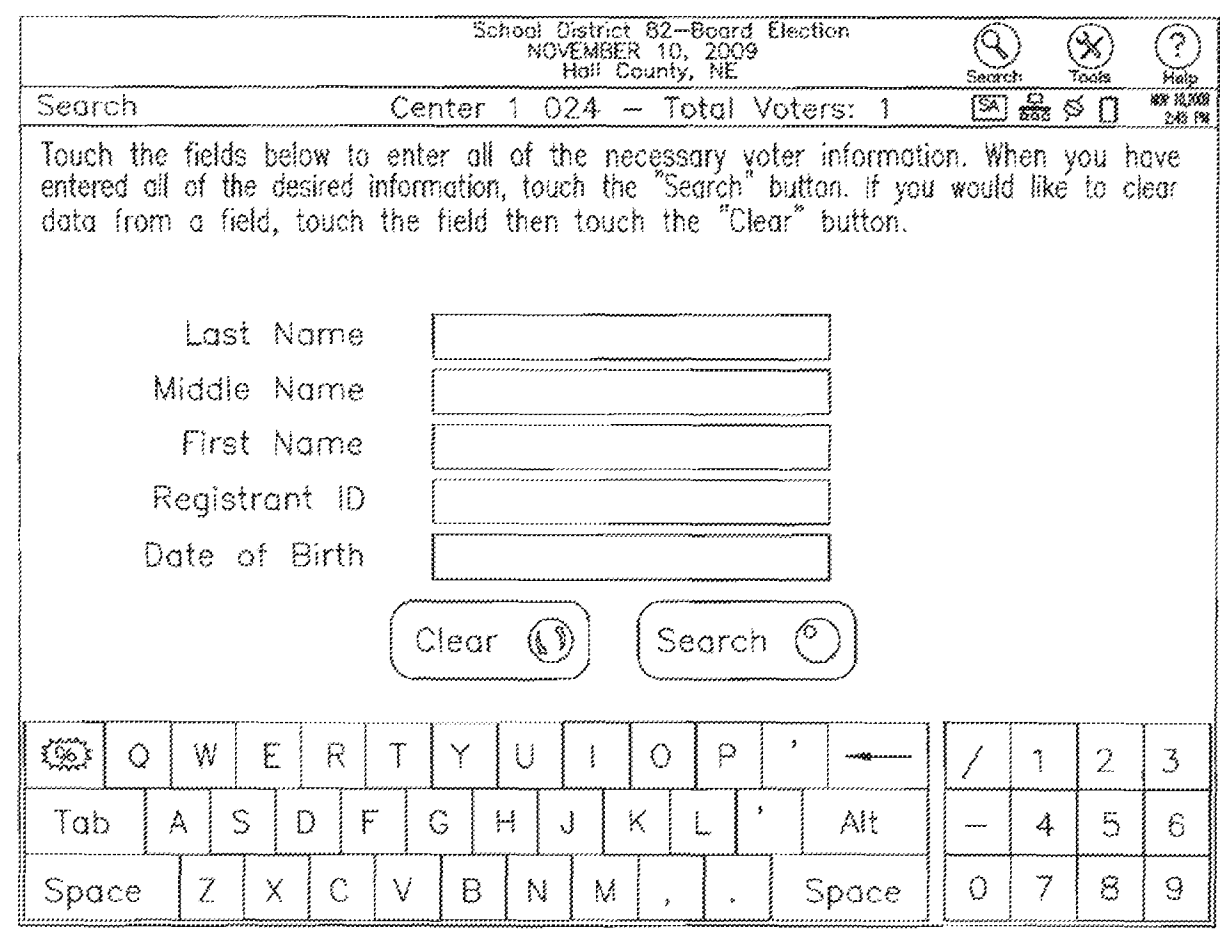
Figure 3B:
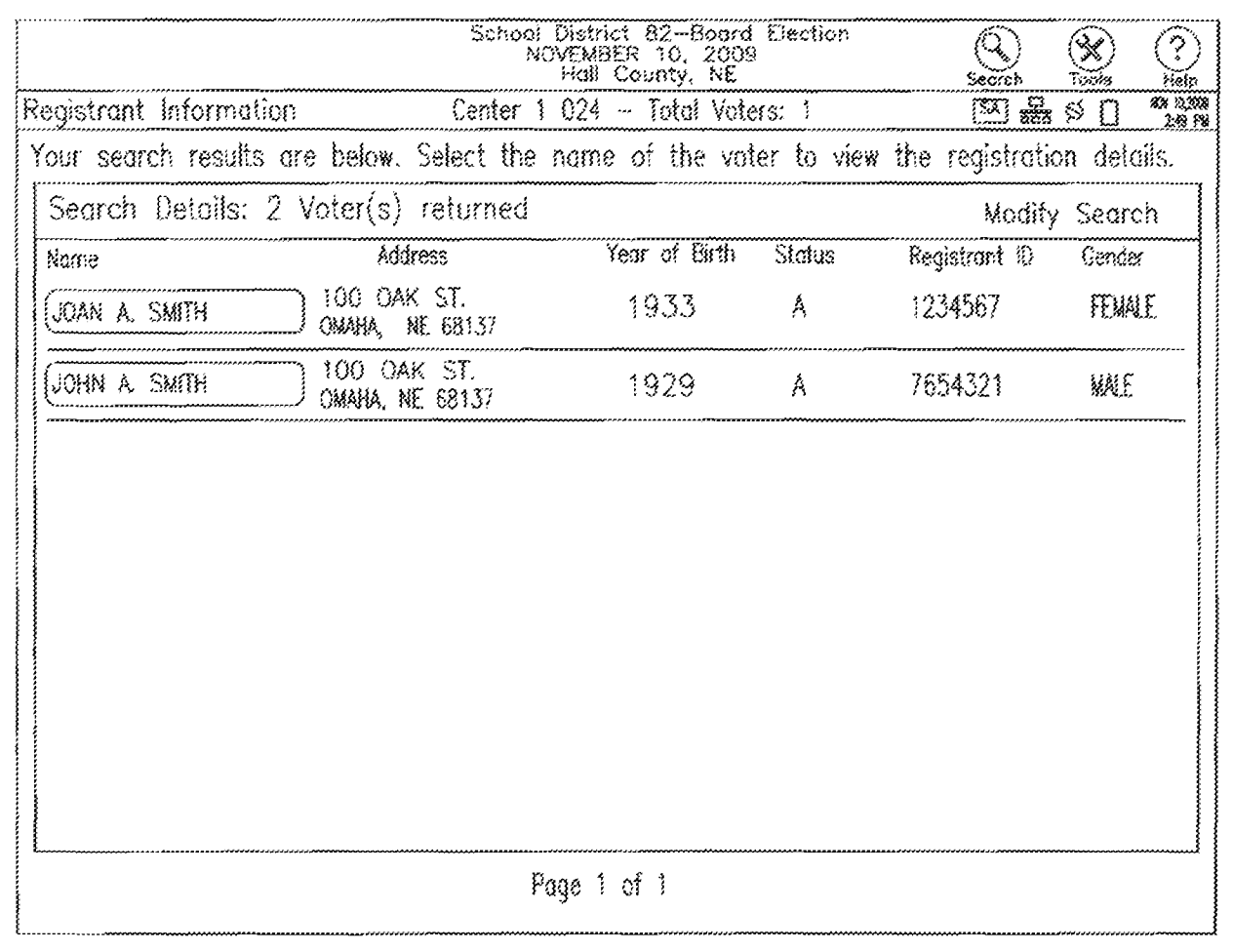
Figure 3C:
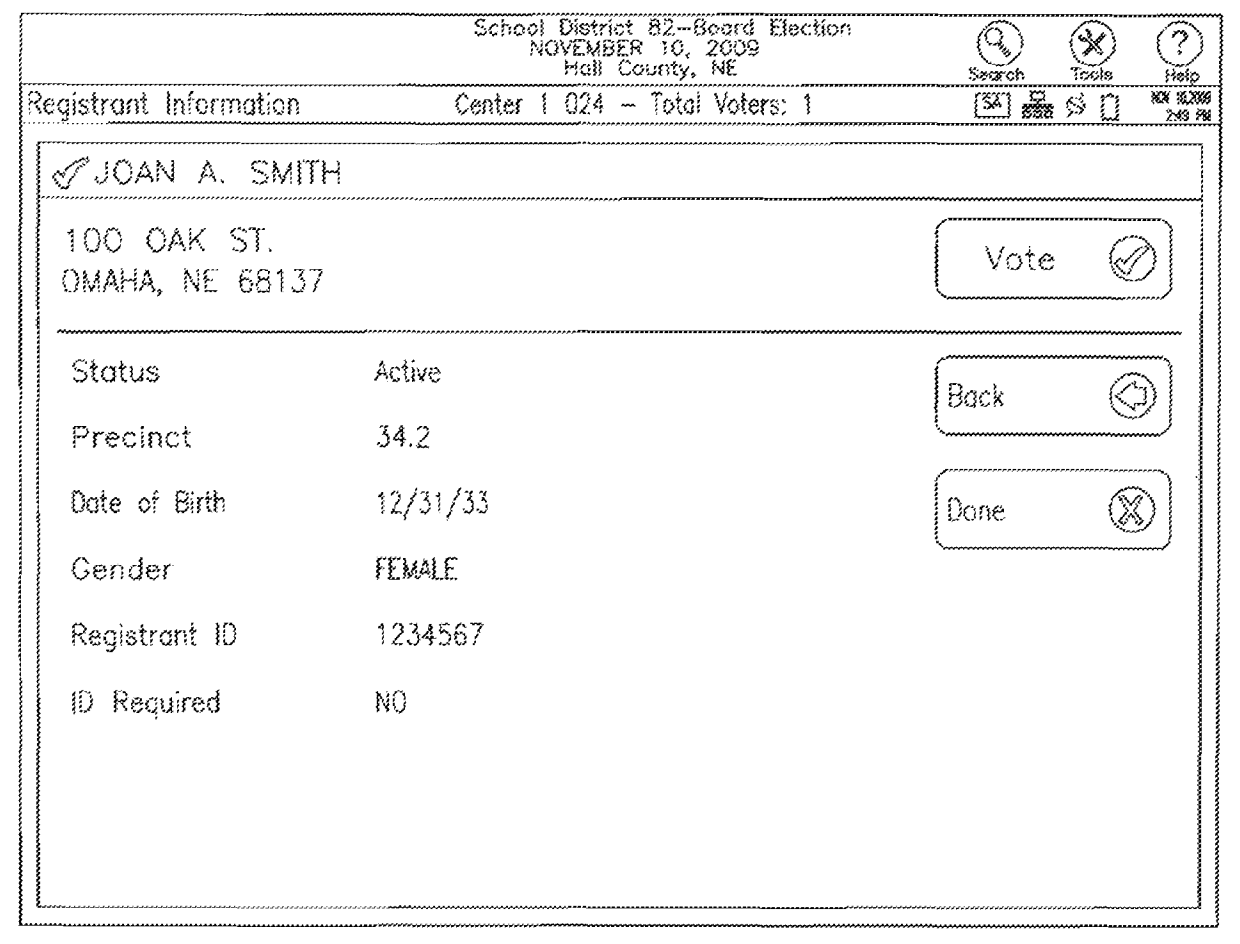
Figure 3E:

Referring now to FIG. 2, a process flow diagram is provided that shows an exemplary method for checking-in a voter and, if necessary, un-issuing a voting credit, using poll book 12 of FIG. 1. Typically, a voter enters a polling place and indicates her desire to vote to a poll worker. At block 20, the poll worker uses poll book 12 to search for and locate the voter record corresponding to the voter. An exemplary "voter search" screen that may be displayed on poll book 12 is shown in FIG. 3A. This screen provides various search fields where voter information may be entered. These fields may include last name, middle name, first name, voter registration number (also called registrant ID), and date of birth. Additional or alternative search fields such as driver's license number, all or part of a social security number, or a year of birth may also be used. In general, the more voter information entered into the various search fields, the fewer search results will be returned. In this embodiment, the search fields may be populated using a touch screen keypad (as shown) or standard keyboard 16. At anytime, the poll worker can select the "clear" button to clear all the search fields and start over.

When one or more search fields have been populated, the poll worker selects the "search" button and poll book 12 searches the voter database for voter records that meet the search criteria. All of the voter records that meet the search criteria are located in the voter database and displayed in summary form to the poll worker for review. An exemplary "search results" screen that may be displayed on poll book 12 is shown in FIG. 3B. In this example, the search criteria consisted of the last name "Smith." As shown, the "search results" screen displays summary information corresponding to each voter record so that the poll worker can readily identify which voting record belongs to the voter currently prepared to vote.

With reference to FIG. 2 at block 22, the poll worker next opens the appropriate voter record for full display. For example, the voter record can be opened from the "search results" screen shown in FIG. 3B by selecting the appropriate voter name. In the present example, Joan A. Smith's voter record is selected and opened. In theory, only one voter record will be returned if all the search fields are used to search for a particular voter. If only one voter record is found using the information entered into the search fields by the poll worker, the voter record will open in full without first presenting the poll worker with the "search results" screen of FIG. 3B.

An exemplary "voter record display" screen is shown in FIG. 3C. A typical voter record will include information such as name, address, voter status, precinct identifier, date of birth, gender, registrant ID, and whether identification is required. The "voter record display" screen also informs the poll worker as to whether this voter has already been issued a voting credit for the election.

Wither reference to FIG. 2 at block 24, the poll worker will next determine whether the voter has been previously issued a voting credit for the election. In the exemplary "voter record display" screen shown in FIG. 3C, a voter record is displayed for a voter who was not previously issued a voting credit for the election. The poll worker may select the "vote" button once she is satisfied that this voter record belongs to the voter currently prepared to vote. If the poll worker determines that this is not the correct voter record, the poll worker may select the "back" button to return to the previous screen or the "done" button to return to the initial "voter search" screen.

With reference to FIG. 2 at block 24, the poll worker will issue a voting credit to the voter if a voting credit has not been previously issued and allow the voter to vote and cast a regular ballot for the election. As shown in the exemplary "voter record display" screen of FIG. 3C, the poll worker issues the voting credit by selecting the "vote" button. Optionally, the date, time, or polling place may be recorded in conjunction with the issuance of a voting credit. At this time, a "confirmation" screen may be displayed that informs the poll worker that the check-in process has been completed and that the poll worker may now instruct the voter on how to complete the voting process. After the voter has received her voting instructions, the poll worker can select the "done" button to return to a blank "voter search" screen ready for the next voter in line.

With reference to FIG. 2 at block 28, the poll worker could determine that a voting credit has previously been issued to the voter for the election. In an exemplary "voter record display" screen shown in FIG. 3D, a voter record is displayed for a voter that was previously issued a voting credit for the election. Here, the poll worker may select the "done" button and return to the "voter search" screen or may select the "un-issue credit" button to initiate the un-issue voting credit process. The procedure that a poll worker must follow to determine whether a voting credit was previously issued in error is specific to each jurisdiction.

The poll worker initiates the un-issue voting credit process if she believes that the voting credit was initially issued in error. As shown in the exemplary "voter record display" screen of FIG. 3D, the un-issue voting credit process may be initiated by selecting the "un-issue credit" button. After the "un-issue credit" button is selected, the poll worker will be prompted to enter an un-issue code. As shown in the exemplary "un-issue code" screen of FIG. 3E, the poll worker may be presented with instructions on how to un-issue the voting credit.

In the exemplary embodiment, the central election office maintains control over the un-issue voting credit process and administers the un-issue code. In this case, the poll worker may see instructions to contact the central election office on the "un-issue code" screen, as shown in the exemplary screen of FIG. 3E. The poll worker may then call, e-mail or otherwise contact an election administrator at the central election office for the purpose of obtaining an un-issue code. A description of how an un-issue code is generated or located for a particular voter is described below in connection with FIGS. 4A and 4B. The poll worker receives the un-issue code from the election administrator and may enter such code as shown in the exemplary "un-issue code" screen of FIG. 3E. After entering the un-issue code, the poll worker may select the "un-issue" button to un-issue the voting credit. The entered un-issue code is then verified to ensure that it is a valid code. With reference to FIG. 1 at block 30, the poll worker will then be able to issue a voting credit and allow the voter to vote a regular ballot in the election as described above in connection with FIGS. 3A-3C.

As mentioned above, in the exemplary embodiment, an election administrator at the central election office makes the determination of whether a voting credit was erroneously issued to a voter in accordance with the laws of the applicable jurisdiction. A voter may be erroneously issued a voting credit, for example, when a poll worker mistakenly selects the voter when checking-in another voter (e.g., when the poll worker selects "John Smith, Jr." when in fact he should have selected "John Smith, Sr."). As another example, a poll worker may check-in a voter and thus issue a voting credit to the voter, whereafter the voter for some reason does not complete the voting process. Other examples are within the scope of the present invention.

Figure 4A:
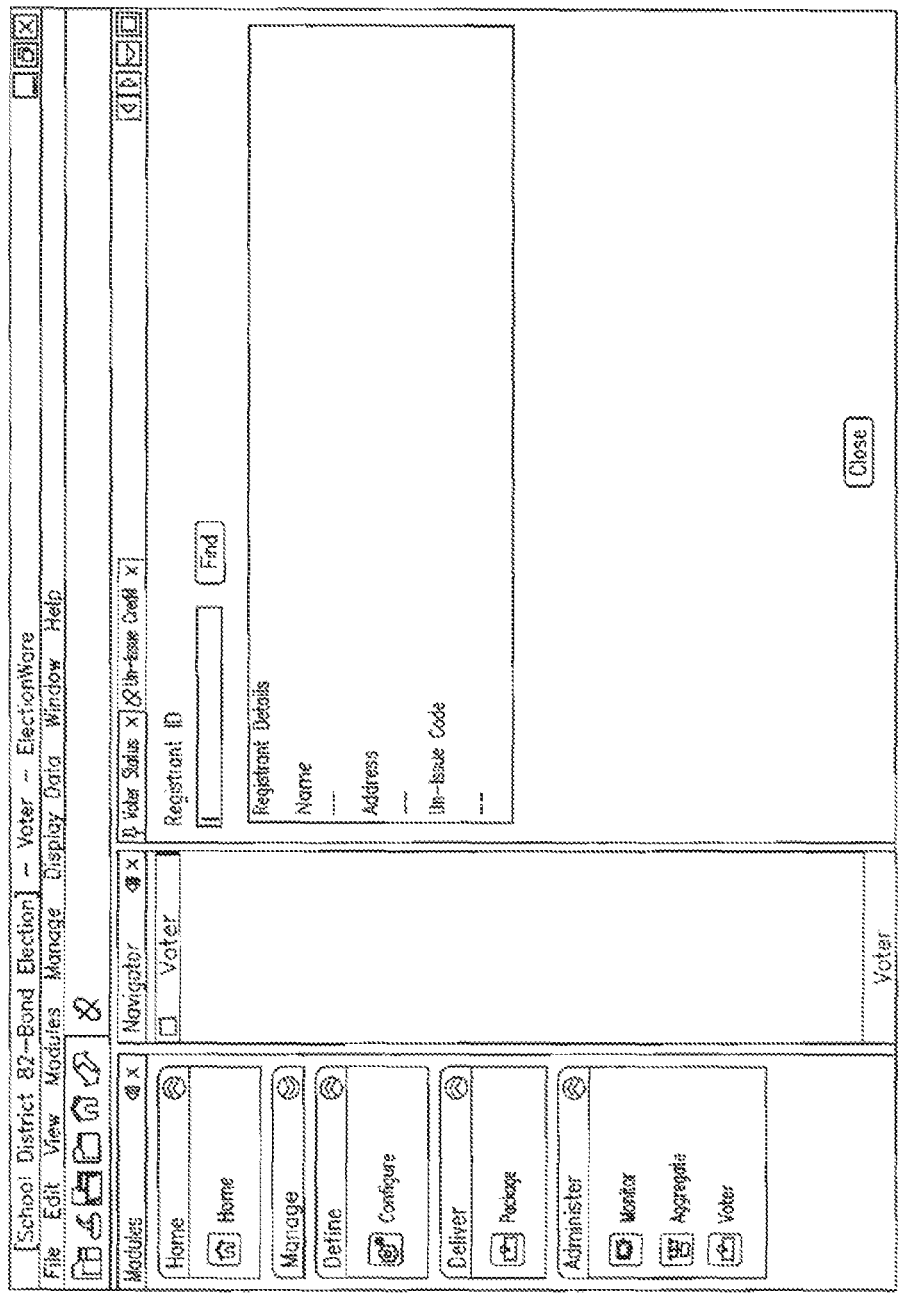
FIGS. 4A-4B are various screen shots of the central election office's computer during the un-issuing voting credit process.
Figure 4B:
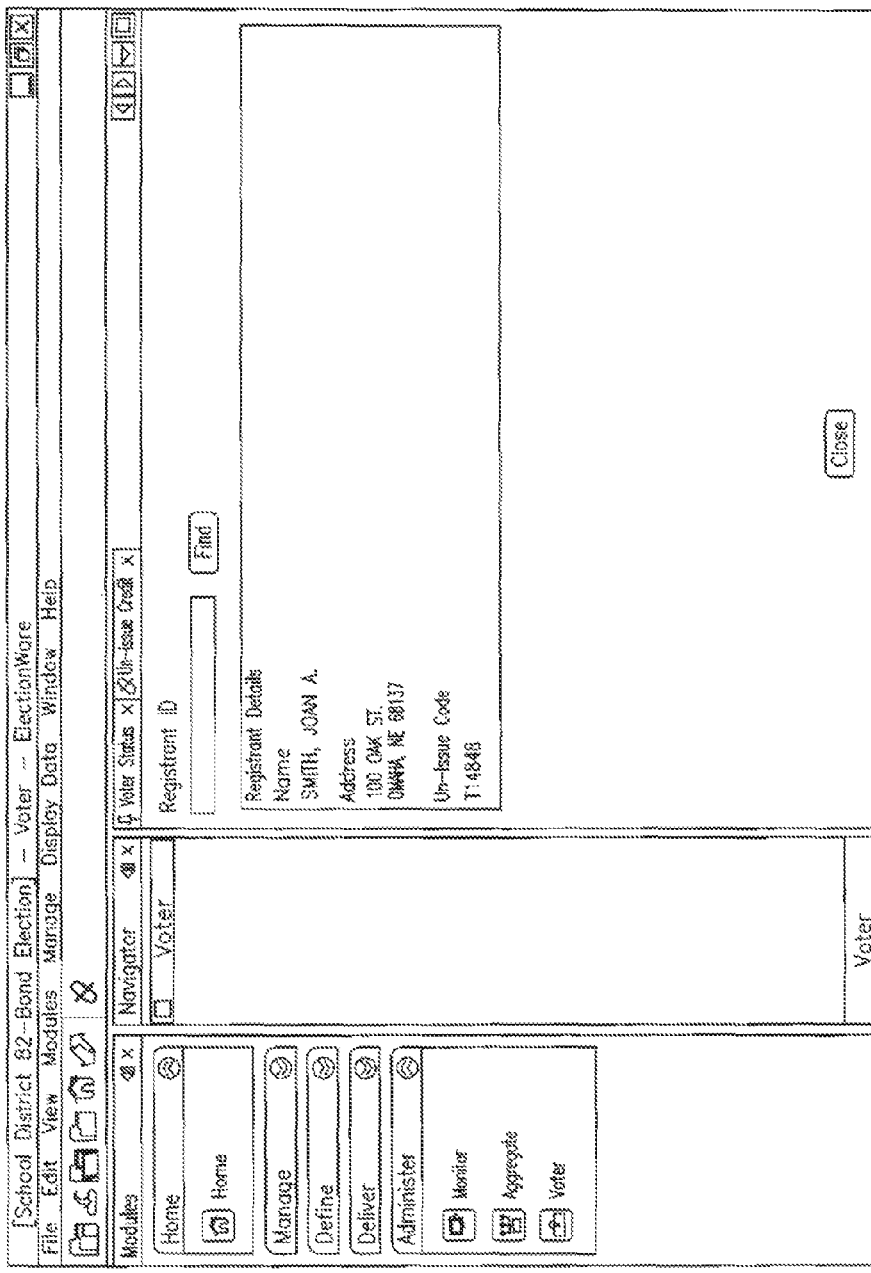

An exemplary process that the central administrator may undertake to generate and provide an un-issue code to the poll worker will now be described with reference to FIGS. 4A and 4B (i.e., after the election administrator has determined that the voting credit was issued in error). Upon request from a poll worker for an un-issue code, the central administrator may access the central voter database using a computer terminal located at the central election office. An exemplary "voter module" screen is shown in FIG. 4A, which depicts an "un-issue credit" tab. By selecting the "un-issue credit tab," the central administrator may enter the registrant ID or other identifying information provided by the poll worker for the voter at issue. Upon selecting the "find" button, the name and address fields corresponding to the identified voter will populate the "registrant details" box, along with an un-issue code associated with the voter, all as shown in the exemplary "voter module" screen of FIG. 4B. The central administrator then communicates the un-issue code to the poll worker (e.g., via telephone, e-mail or otherwise) and the poll worker enters the un-issue code into poll book 12 as described above.

In the exemplary embodiment, the computer terminal located at the central election office generates the un-issue code by running a conventional hashing algorithm against the voter registration number and the election code to generate a hash value. Of course, other data associated with the voter and/or the election could also be used, such as voter name, date of birth, address, election name, election date, or a predetermined seed number. When the poll worker enters the un-issue code/hash value into poll book 12, poll book 12 runs the same conventional hashing algorithm to generate a hash value for the voter. The poll book-generated hash value is then compared to the un-issue code/hash value entered by the poll worker. If the hash values are identical, the un-issue code/hash value entered by the poll worker is verified and the voting credit is un-issued. It should be understood that verification of the validity of the un-issue code/hash value entered by the poll worker enables the central election office to maintain control over the actions of the poll workers at the various polling locations with respect to the un-issuance of voting credits.

Of course, it should be understood that other types of un-issue codes may be used in accordance with the present invention. For example, the un-issue code may comprise a universal passcode that is the same for each voter. The un-issue code may also comprise a sequence of alphanumeric characters that is unique to each voter. Regardless of the type of un-issue code, poll book 12 is preferably configured to verify the validity of the un-issue code as a prerequisite to permitting un-issuance of a voting credit.

In the exemplary embodiment, the voter database on poll book 12 is preferably configured to store an audit record that includes information relating to the issuance and un-issuance of voting credits for all voters. As such, an auditor or election administrator will be able to view all instances in which a voting credit was issued and all instances in which a voting credit was un-issued in relation to each voter. Also, detailed information about each issuance of a voting credit and/or un-issuance of a voting credit can be generated in a report. For example, the report may include detailed information relating to each instance in which a voting credit was issued and subsequently un-issued, such as the voter name, voter address, voter registration number, date/time that the voting credit was issued, date/time that the voting credit was un-issued, and the un-issue code used. One skilled in the art will appreciate that various types of audit records and reports may be generated in accordance with the present invention.

Finally, in the exemplary embodiment described above, the central election office maintains control over the actions of the poll workers at the various polling locations with respect to the un-issuance of voting credits. In one embodiment, this is accomplished by verifying the validity of the un-issue code entered into the poll book by the poll worker through the use of conventional hashing algorithms. This same verification process may be used by the central election office to control other actions taken by the poll worker on the poll book, such as issuing a ballot if a voter has already been mailed an absentee ballot, changing the address of a voter, or providing same-day voter registration.

Further, the central election office's ability to maintain control over poll worker actions is not limited to actions taken on a poll book, and may be used in connection with other types of voting devices. For example, this same verification process could be used to control various actions taken by a poll worker on a tabulator/ballot scanning device, such as re-opening the poll, zeroing-out the vote totals on the scanner, overriding a set or predetermined closing time, starting-up a backup scanner after failure of the original scanner (including insertion of the card/stick from the original scanner), and any of the various "override" functions available on the scanner. Of course, one skilled in the art will appreciate that the code provided by the central election office to permit any of the described actions could be entered by the poll worker into an input device of the scanner, such as a physical keypad or touch screen display.

While the present invention has been described and illustrated hereinabove with reference to an exemplary embodiment, it should be understood that various modifications could be made to this embodiment without departing from the scope of the invention. Therefore, the invention is not to he limited to the specific system and method described and illustrated above, except insofar as such limitations are included in the following claims.

What is claimed and desired to he secured by Letters Patent is as follows:

1. A computer-implemented method for un-issuing a voting credit that has been erroneously issued and stored in relation to a voter registration record, the method comprising:
   maintaining a database containing a plurality of voter registration records each of which includes (i) voter information comprising a voter name, a voter date of birth, and a voter registration number and (ii) an indication of whether a voting credit has been issued to a voter for an election;
   identifying, by the processor, a voter registration record corresponding to a voter in the database;
   determining, by the processor, that the voter registration record includes an indication that a voting credit has been issued to the voter for the election;
   displaying an indication that the voter has already voted in the election;
   receiving, by the processor, an un-issue code entered by a poll worker, wherein the un-issue code comprises a hash value generated by a computer located at a central election office via the execution of a hashing algorithm;
   verifying, by the processor, the validity of the un-issue code by executing the hashing algorithm to generate a second hash value and comparing the second hash value to the hash value entered by the poll worker; and
   updating, by the processor, the voter registration record in the database by modifying the indication that the voting credit has been issued to the voter for the election so as to un-issue the voting credit.

2. The computer-implemented method of claim 1, wherein the database is configured to store voter registration records for all registered voters in a jurisdiction.

3. The computer-implemented method of claim 1, wherein the indication that the voter has already voted in the election comprises a textual message.

4. The computer-implemented method of claim 1, wherein the hash value is generated using one or more of the voter registration number, an election code for the election, the voter name, the voter date of birth, a voter address, an election name, an election date, and a predetermined seed number.

5. The computer-implemented method of claim 1, wherein an administrator at the central election office determines that the voting credit was erroneously issued to the voter in the election.

6. The computer-implemented method of claim 5, wherein the hash value is communicated from the administrator to the poll worker.

7. The computer-implemented method of claim 1, wherein the database is configured to store an audit record that includes information relating to the issuance and un-issuance of the voting credit for the voter.

8. A computer-implemented method for un-issuing a voting credit that has been erroneously issued and stored in relation to a voter registration record, the method comprising:
   maintaining a database containing a plurality of voter registration records each of which includes (i) voter information comprising a voter name, a voter date of birth, and a voter registration number and (ii) an indication of whether a voting credit has been issued to a voter for an election;
   identifying, by the processor, a voter registration record corresponding to a voter in the database;
   determining, by the processor, that the voter registration record includes an indication that a voting credit has been issued to the voter for the election;
   displaying an indication that the voter has already voted in the election;

receiving, by the processor, an un-issue code entered by a poll worker, wherein the un-issue code is communicated from an administrator at a central election office to the poll worker based upon a determination by the administrator that the voting credit was erroneously issued to the voter for the election;

verifying, by the processor, the validity of the un-issue code entered by the poll worker as a prerequisite to permitting un-issuance of the voting credit; and updating, by the processor, the voter registration record in the database by modifying the indication that the voting credit has been issued to the voter for the election so as to un-issue the voting credit in response to verification of the validity of the un-issue code.

9. The computer-implemented method of claim 8, wherein the database is configured to store voter registration records for all registered voters in a jurisdiction.

10. The computer-implemented method of claim 8, wherein the indication that the voter has already voted in the election comprises a textual message.

11. The computer-implemented method of claim 8, wherein the un-issue code comprises a universal passcode.

12. The computer-implemented method of claim 8, wherein the un-issue code comprises a unique code for the voter.

13. The computer-implemented method of claim 8, wherein the un-issue code comprises a hash value generated by a computer via the execution of a hashing algorithm using one or more of the voter registration number, an election code for the election, the voter name, the voter date of birth, a voter address, an election name, an election date, and a predetermined seed number.

14. The computer-implemented method of claim 13, wherein the computer is located at a central election office.

15. The computer-implemented method of claim 14, wherein the hash value is entered by a poll worker.

16. The computer-implemented method of claim 15, wherein the processor verifies the validity of the un-issue code by executing the hashing algorithm to generate a second hash value and comparing the second hash value to the hash value entered by the poll worker.

17. The computer-implemented method of claim 8, wherein the database is configured to store an audit record that includes information relating to the issuance and un-issuance of the voting credit for the voter.

18. A system for un-issuing a voting credit that has been erroneously issued and stored in relation to a voter registration record, the system comprising:

a storage device for storing a database containing a plurality of voter registration records each of which includes (i) voter information comprising a voter name, a voter date of birth, and a voter registration number and (ii) an indication of whether a voting credit has been issued to a voter for an election;

a computer programmed to generate a hash value via the execution of a hashing algorithm;

an electronic poll book programmed to perform the following steps:

identify a voter registration record corresponding to a voter in the database;

determine that the voter registration record includes an indication that a voting credit has been issued to the voter for the election;

display an indication that the voter has already voted in the election;

receive an un-issue code for the voter, wherein the un-issue code comprises the hash value generated by the computer for the voter;

verify the validity of the un-issue code by executing the hashing algorithm to generate a second hash value and comparing the second hash value to the hash value generated by the computer; and update the voter registration record in the database by modifying the indication that the voting credit has been issued to the voter for the election so as to un-issue the voting credit.

19. The system of claim 18, wherein the storage device comprises a memory device of the electronic poll book.

20. The system of claim 18, wherein the storage device is separate from the electronic poll book, and wherein the system further comprises a communication link between the storage device and the electronic poll book.

21. The system of claim 18, wherein the database contains voter registration records for all registered voters in a jurisdiction.

22. The system of claim 18, wherein the indication that the voter has already voted in the election comprises a textual message.

23. The system of claim 18, wherein the hash value is generated by the hashing algorithm using one or more of the voter registration number, an election code for the election, the voter name, the voter date of birth, a voter address, an election name, an election date, and a predetermined seed number.

24. The system of claim 18, wherein the hash value generated by the computer is entered by a poll worker.

25. The system of claim 18, wherein the database contains an audit record that includes information relating to the issuance and un-issuance of the voting credit for the voter.

26. A non-transitory computer-readable medium having instructions stored thereon for execution by a processor to perform a method for un-issuing a voting credit that has been erroneously issued and stored in relation to a voter registration record, the method comprising the following steps:

identifying a voter registration record corresponding to a voter in a database~ wherein said voter registration record includes (i) voter information comprising a voter name, a voter date of birth, and a voter registration number and (ii) an indication of whether a voting credit has been issued to a voter for an election;

determining that the voter registration record includes an indication that a voting credit has been issued to the voter for the election;

displaying an indication that the voter has already voted in the election;

receiving an un-issue code entered by a poll worker, wherein the un-issue code is communicated from an administrator at a central election office to the poll worker based upon a determination by the administrator that the voting credit was erroneously issued to the voter for the election;

verifying the validity of the un-issue code entered by the poll worker as a prerequisite to permitting un-issuance of the voting credit; and updating the voter registration record in the database by modifying the indication that the voting credit has been issued to the voter for the election so as to un-issue the voting credit in response to verification of the validity of the un-issue code.

27. The computer-readable medium of claim 26, wherein the database is configured to store voter registration records for all registered voters in a jurisdiction.

28. The computer-readable medium of claim 26, wherein the indication that the voter has already voted in the election comprises a textual message.

29. The computer-readable medium of claim 26, wherein the un-issue code comprises a universal passcode.

30. The computer-readable medium of claim 26, wherein the un-issue code comprises a unique code for the voter.

31. The computer-readable medium of claim 26, wherein the un-issue code comprises a hash value generated by a computer via the execution of a hashing algorithm using one or more of the voter registration number, an election code for the election, the voter name, the voter date of birth, a voter address, an election name, an election date, and a predetermined seed number.

32. The computer-readable medium of claim 31, wherein the hash value is entered by a poll worker.

33. The computer-readable medium of claim 32, wherein verifying the validity of the un-issue code comprises executing the hashing algorithm to generate a second hash value and comparing the second hash value to the hash value entered by the poll worker.

34. The computer-readable medium of claim 26, wherein the database contains an audit record that includes information relating to the issuance and un-issuance of the voting credit for the voter.

35. An electronic poll book, comprising:
a display;
a memory device for storing a database containing a plurality of voter registration records each of which includes (i) voter information comprising a voter name, a voter date of birth, and a voter registration number and (ii) an indication of whether a voting credit has been issued to a voter for an election;
a processor programmed to perform the following steps:
identify a voter registration record corresponding to a voter in the database;
determine that the voter registration record includes an indication that a voting credit has been issued to the voter for the election;
present a screen on the display that includes an indication that the voter has already voted in the election;
receive an un-issue code entered by a poll worker, wherein the un-issue code is communicated from an administrator at a central election office to the poll worker based upon a determination by the administrator that the voting credit was erroneously issued to the voter for the election;
verify the validity of the un-issue code entered by the poll worker as a prerequisite to permitting un-issuance of the voting credit; and
updating the voter registration record in the database by modifying the indication that the voting credit has been issued to the voter for the election so as to un-issue the voting credit in response to verification of the validity of the un-issue code.

36. The electronic poll book of claim 35, wherein the database contains voter registration records for all registered voters in a jurisdiction.

37. The electronic poll book of claim 35, wherein the indication that the voter has already voted in the election comprises a textual message.

38. The electronic poll book of claim 35, wherein the un-issue code comprises a universal passcode.

39. The electronic poll book of claim 35, wherein the un-issue code comprises a unique code for the voter.

40. The electronic poll book of claim 35, wherein the un-issue code comprises a hash value generated by a computer via the execution of a hashing algorithm using one or more of the voter registration number, an election code for the election, the voter name, the voter date of birth, a voter address, an election name, an election date, and a predetermined seed number.

41. The electronic poll book of claim 40, wherein the poll book further comprises an input device and the hash value is entered by a poll worker via the input device.

42. The electronic poll book of claim 41, wherein the input device comprises the display.

43. The electronic poll book of claim 41, wherein the input device comprises a keyboard, a barcode reader, a magnetic stripe reader, or a virtual on-screen keypad.

44. The electronic poll book of claim 41, wherein the processor verifies the validity of the un-issue code by executing the hashing algorithm to generate a second hash value and comparing the second hash value to the hash value entered by the poll worker.

45. The electronic poll book of claim 35, wherein the database contains an audit record that includes information relating to the issuance and un-issuance of the voting credit for the voter.

* * * * *